United States Patent [19]

Miyata

[11] 4,300,336
[45] Nov. 17, 1981

[54] CUTTER BLADE ASSEMBLY FOR WEED AND GRASS TRIMMERS

[75] Inventor: Hiromasa Miyata, Evanston, Ill.

[73] Assignee: Echo, Incorporated, Northbrook, Ill.

[21] Appl. No.: 73,923

[22] Filed: Sep. 10, 1979

[51] Int. Cl.³ .............................................. A01D 55/18
[52] U.S. Cl. ........................................ 56/295; 30/276
[58] Field of Search ................... 56/12.7, 295; 30/276, 30/347, 337, 339

[56] References Cited

U.S. PATENT DOCUMENTS

| | | | |
|---|---|---|---|
| 2,439,071 | 4/1968 | Basham | 30/337 |
| 3,176,455 | 4/1965 | Buchanan | 56/295 |
| 3,343,350 | 9/1967 | Freedlander et al. | 56/295 |
| 3,717,985 | 2/1973 | Freedlander et al. | 56/295 |
| 4,086,700 | 5/1978 | Iwada | 56/295 |
| 4,107,841 | 8/1978 | Rebhun | 30/276 |

Primary Examiner—Robert A. Hafer

[57] ABSTRACT

A lawn trimmer has a cutting blade that is formed entirely of a flexible elastomer material, such as polyurethane. The cutting blade is a generally flat, circular plate, having a rim and a plurality of cutting teeth extending outwardly from the rim. The rim has an outer diameter, with the teeth extending outwardly from the outer diameter, and an inner diameter which defines a central opening.

A securing plate is used to mount the cutting blade to the lawn trimmer. The securing plate has a central portion secured to the lawn trimmer and an outer portion that overlies the rim of the cutting blade. Various embodiments are disclosed for fixedly attaching the securing plate to the rim of the cutting blade.

4 Claims, 9 Drawing Figures

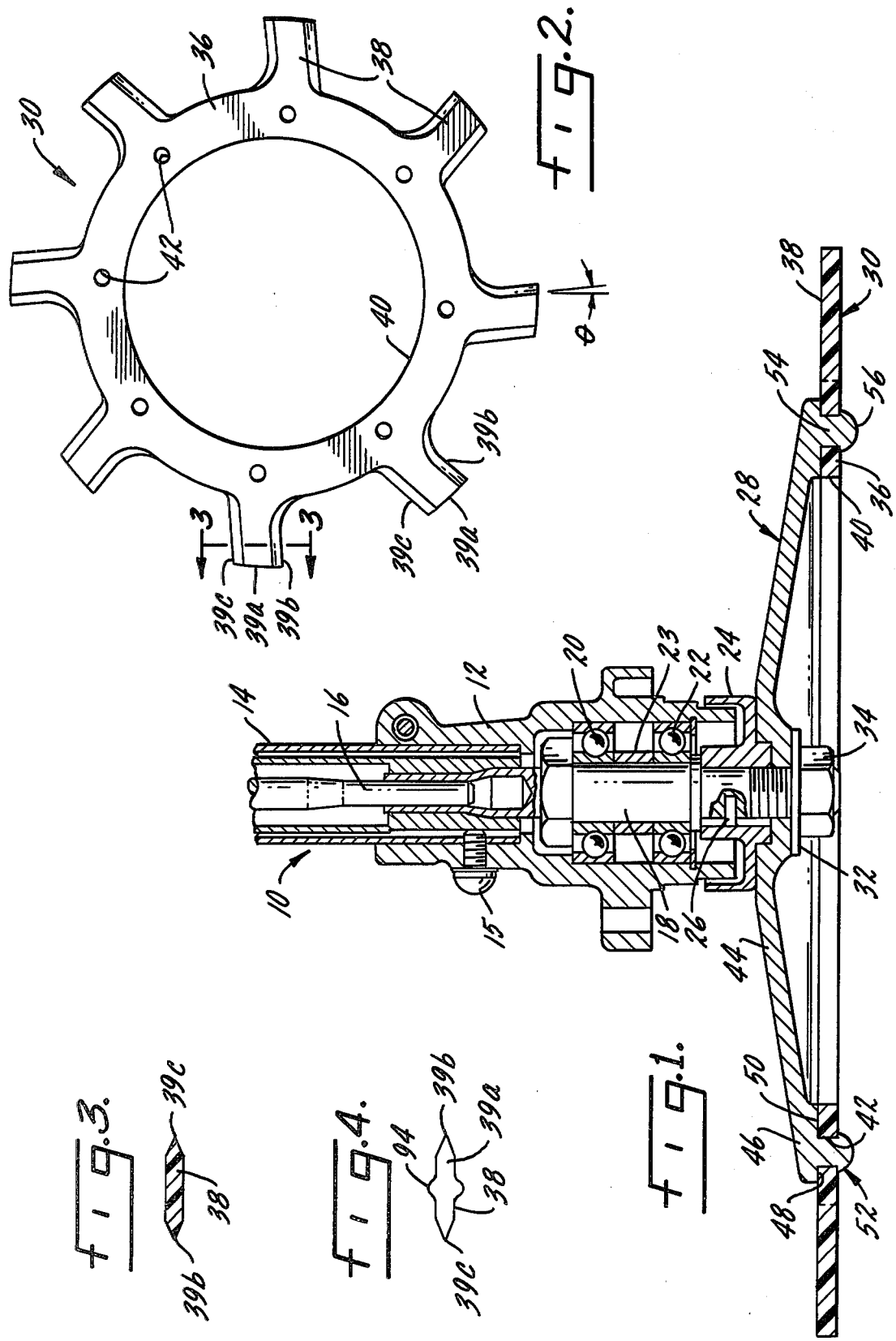

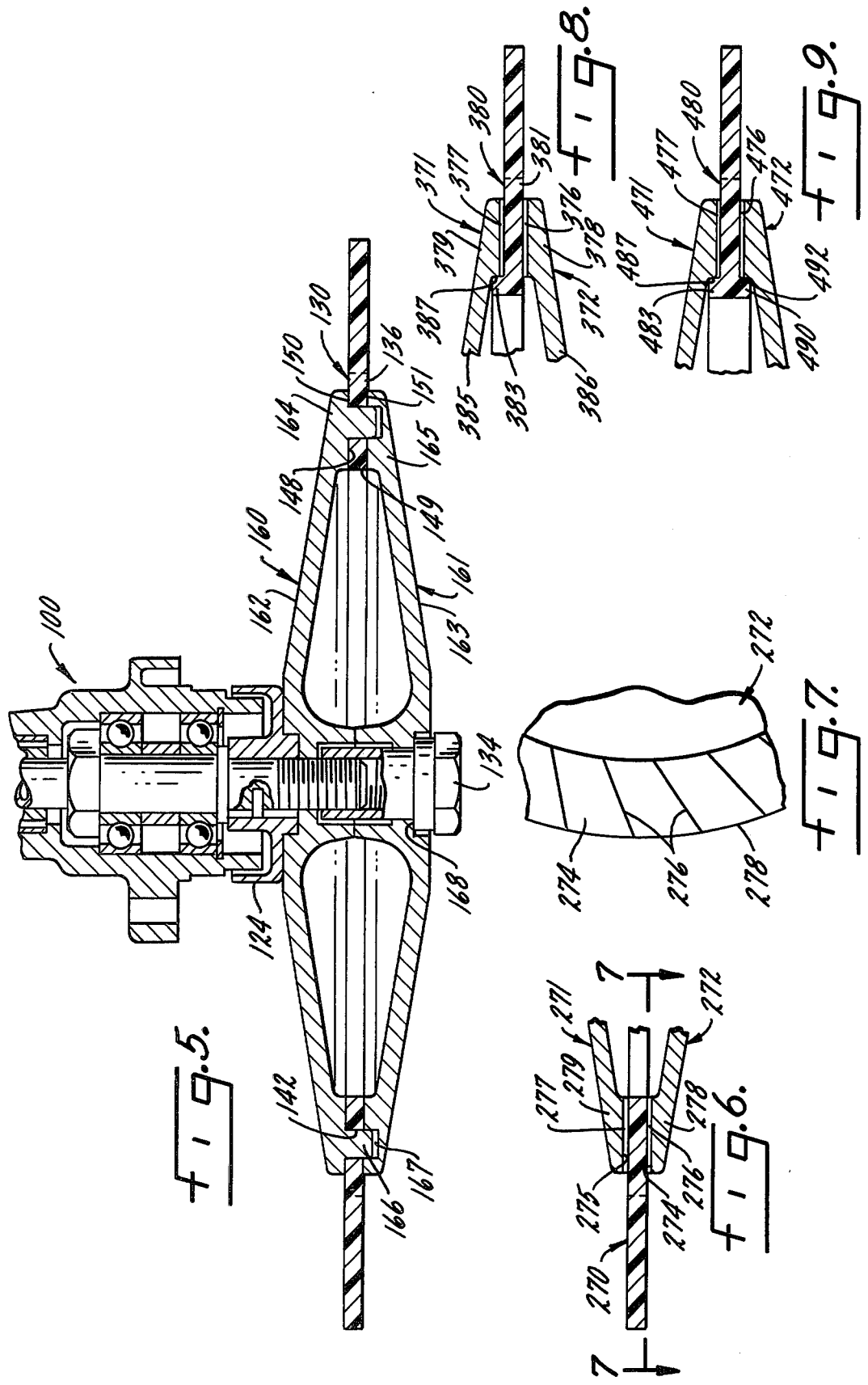

CUTTER BLADE ASSEMBLY FOR WEED AND GRASS TRIMMERS

BACKGROUND OF THE INVENTION

The present invention relates to lawn trimmers and, more particularly, to lawn trimmers having a cutting blade that is formed entirely of a flexible plastic material.

Lawn trimmers are used to cut weeds and grass. Conventional lawn trimmers are powered either by gasoline or electricity, and a nylon line performs the cutting.

There are disadvantages in using a nylon line for cutting with a lawn trimmer. Small engines are used in the lawn trimmers, and they easily overload when cutting a thickly grown area. Another disadvantage in cutting with nylon lines is that they cannot be tapered to provide a knifelike cutting edge, thereby weakening the power with which the cutting is performed.

In an attempt to overcome these problems, lawn trimmers have been made in which a flexible plastic blade has been substituted for the nylon line. These prior art flexible plastic blades are disadvantageous, however, because they include a rigid central section which increases the cost of manufacturing the cutting component of the lawn trimmer.

SUMMARY OF THE INVENTION

The present invention overcomes the problems of the prior art by providing a cutting blade that is formed entirely of a flexible elastomer material, such as polyurethane. The cutting blade is a generally flat, circular plate, having a rim and a plurality of cutting teeth extending outwardly from the rim. The rim has an outer diameter, with the teeth extending outwardly from the outer diameter, and an inner diameter which defines a central opening.

Several arrangements are provided for releasably securing the cutting blade to the lawn trimmer. In one embodiment, a plurality of through-apertures are defined by the rim. A securing plate has a central portion secured to the lawn trimmer and an outer portion having a plurality of downwardly extending protrusions. The securing plate overlies the cutting blade with the protrusions extending through the apertures in the cutting blade to secure the cutting blade to the securing plate.

In other embodiments, a pair of securing plates are provided, with one securing plate above the cutting blade and the other below the cutting blade. Both securing plates have a central portion which is mounted to the lawn trimmer. In one of these embodiments, the face of the outer portion of each securing plate that engages the rim of the cutting blade is provided with a plurality of teeth which bite into the flexible rim to secure the cutting blade to the securing plates.

In another embodiment, the securing plate has a shoulder at the juncture of the outer portion and the central portion thereof. The cutting blade has a rib extending outwardly from at least one surface of the rim adjacent the central opening, and the rib on the cutting blade engages the shoulder of the securing plate to fixedly attach the cutting blade to the securing plates.

In still another embodiment, one of the securing plates has a plurality of outwardly extending pins along the outer portion thereof and the other securing plate defines a plurality of grooves for receiving the pins. The rim of the cutting blade defines a plurality of apertures through which the pins are extended for mounting the cutting blade to the securing plate.

It is a feature of all of the foregoing embodiments that the cutting blade is easily removable from the securing plates so that the cutting blade can be replaced when desired, as when it becomes worn.

BRIEF DESCRIPTION OF THE DRAWINGS

FIG. 1 is a cross-sectional view of the cutting blade of the present invention attached to a lawn trimmer;

FIG. 2 is a plan view of the cutting blade in accordance with the present invention;

FIG. 3 is an enlarged cross-sectional view taken along line 3—3 in FIG. 2;

FIG. 4 is an elevational view of a modified form of a cutting tooth in accordance with the present invention;

FIG. 5 is a cross-sectional view of another embodiment of the cutting blade of the present invention attached to a lawn trimmer;

FIG. 6 is a cross-sectional view showing one form of attachment between the cutting blade and securement plates;

FIG. 7 is a view taken along line 7—7 in FIG. 6;

FIG. 8 is a cross-sectional view showing another form of attachment between the cutting blade and securement plates; and FIG. 9 is a cross-sectional view showing another modified form of attachment between the cutting blade and securement plates.

DESCRIPTION OF THE PREFERRED EMBODIMENTS

Referring to the drawings, FIG. 1 illustrates a partial view of a lawn trimmer 10 having a housing 12 upon which a motor (not shown) is mounted. The motor has a hollow shaft 14 that has one end attached to the engine and an opposite end that is secured to the housing 12 by screw 15. Inside the shaft 14 there is a flexible shaft 16 that transmits power from the engine to the power transmission shaft 18 which is freely rotated by two bearing races 20 and 22 which are positioned on opposite sides of spacer 23.

The flexible shaft 16 and the power transmission shaft 18 are joined by male and female squared ends. One end of the power transmission shaft 18 is secured to a fitting plate 24 by a pin or key 26. The fitting plate transmits energy through the securement plate 28 which holds the plastic cutting blade 30. The securement plate 28 is attached to the fitting plate 24 by means of a washer 32 and nut 34 that has a hexagonal head. The nut 34 is received in a threaded opening in the fitting plate 24.

The cutting blade 30, illustrated in FIGS. 1 and 2, is a generally flat plate having a predetermined thickness and is formed solely of a flexible plastic material, such as polyurethane. The cutting blade 30 is generally circular and has a rim 36 and a plurality of cutting teeth 38 extending outwardly from the rim. The rim has a predetermined outer diameter and a predetermined inner diameter that defines a central opening 40.

The cutting blade 30 is secured to the lawn trimmer 10 by means of the securing plate 28. In accordance with this invention, various means are disclosed for securing the cutting blade 30 to the lawn trimmer. Numerals between 10–99 are used to refer to the embodiment illustrated in FIGS. 1 and 2, numerals in the 100 series are used to refer to the embodiment shown in FIG. 5, numerals in the 200 series are used to refer to the embodiment shown in FIGS. 6 and 7, numerals in the 300 series are used to refer to the embodiment shown in FIG. 8, and numerals in the 400 series are used to refer to the embodiment shown in FIG. 9. The same last two digits in each numeral designate similar elements in the various embodiments.

In the embodiment illustrated in FIGS. 1 and 2, a plurality of apertures 42 are defined by the rim 36 and are spaced-apart around the circumference of the rim. Preferably, an aperture 42 is provided in the rim adjacent to, and spaced inwardly from, each cutting tooth 38. The apertures 42 have a predetermined diameter.

As shown in FIG. 1, the securing plate 28 is generally circular and has a central portion 44 and an outer portion 46. The securing plate 28 overlies the cutting blade 30 and is generally conical, with the central portion 44 being spaced above the plane defined by the cutting blade. The outer portion 46 has a bottom face 48 that is in surface-to-surface engagement with the top surface 50 of the rim 36 of the cutting blade. The securing plate 28 is attached to the lawn trimmer 10 by nut 34.

To secure the cutting blade 30 to the securing plate 28, the securing plate is provided with a plurality of protrusions 52 that extend downwardly from the bottom face 48 of the outer portion 46 of the securing plate. The protrusions 52 correspond in number and in location with the apertures 42 in the cutting blade, are spaced around the circumference of the outer portion 46, and are receivable in the apertures. The protrusions each have a neck 54 having a length about equal to the thickness of the cutting blade 30 and a diameter no greater than the diameter of the apertures 42. The protrusions 52 also have a head 56 which has a diameter greater than the diameter of the apertures 42. Although the securing plate 28 preferably is formed of a rigid material, such as metal, the head 56 of each protrusion 52 is insertable through an aperture 42 due to the elasticity and resiliency of the cutting blade 30. The cutting blade 30 is thereby secured to the securing plate 28, as illustrated in FIG. 1.

If desired, the protrusions and apertures can be reversed, with the outer portion of the securing plate defining apertures and the rim of the cutting blade having a plurality of upstanding resilient protrusions which are receivable in the apertures.

In the embodiment illustrated in FIG. 5, the cutting blade 130 is secured to the lawn trimmer 100 by means of a pair of opposing securing plates 160 and 161. The securing plates each have a central portion 162 and 163, respectively, and an outer portion 164 and 165, respectively.

Securing plate 160 is positioned above cutting blade 130 and securing plate 161 is positioned below the cutting blade. The outer portion of each securing plate engages an opposing surface of the rim 136 of the cutting blade, with the bottom face 148 of securing plate 160 engaging the top face 150 of the cutting blade, and the top face 149 of securing plate 161 engaging the bottom face 151 of the cutting blade.

To prevent relative movement between the securing plates and the cutting blade, one of the securing plates, such as plate 160, is provided with a plurality of pins 166 extending downwardly from the bottom face 148 of the outer portion of the securing plate. The pins 166 are spaced-apart along the circumference of the outer portion 164 of the securing plate 160. The pins 166 correspond to, and are in alignment with, the apertures 142 in the cutting blade 130, and preferably have a diameter no greater than the diameter of the apertures 142.

The outer portion 165 of securing plate 161 defines a plurality of grooves or notches 167 having a diameter at least as great as the diameter of the pins 166. The grooves 167 correspond to, and are in alignment with, the pins 166 in the securing plate 160 and the apertures 142 in the cutting blade 130. The cutting blade 130 is mounted to the securing plates 160 and 161 by extending the pins 166 through the apertures 142 in the cutting blade, and the pins are received in the grooves 167 in the securing plate 161. The securing plates 160 and 161 are attached to the lawn trimmer 100 by means of nut 134 that abuts a shoulder 168 in securing plate 161, and extends through openings defined in the center of the securing plates, with the screw being received in a threaded opening in the fitting plate 124.

In the embodiment illustrated in FIG. 6, a friction fit is utilized to secure the cutting blade 270 to the lawn trimmer by means of upper securing plate 271 and lower securing plate 272. As shown in FIGS. 6 and 7, the top surface 274 of securing plate 272 has a plurality of upstanding teeth 276 extending across the outer portion 278 of the securing plate 272. Similarly, the bottom face 275 of the securing plate 271 has a plurality of downwardly extending teeth 277 across the outer portion 279 of the securing plate 271. Preferably, the teeth 276 and 277 are disposed at an angle relative to the outer edge of the securing plate rather than extending radially outwardly, so that the teeth 276 and 277 crisscross relative to one another. The teeth bite into the top and bottom surfaces of the cutting blade 270 along the rim thereof to fixedly attach the cutting blade to the securing plates.

The cutting blade 380 in the embodiment illustrated in FIG. 8 has a rim 381. At the inner end of the rim, there is a rib 383 that extends upwardly from the top surface of the cutting blade 380. Since the securing plates 371 and 372 are generally conical or disc-shaped, the central portion 385 and 386 of each securing plate is at an angle relative to the horizontal. Since the outer portion 378 and 379 of each securing plate is generally horizontal for engagement with the rim of the cutting blade, a vertical shoulder 387 is defined at the juncture of the central portion and the outer portion of the securement plate 371. The outer surface of the rib 383 in the cutting blade engages the shoulder 387 in the securement plate to prevent relative movement between the cutting blade and securement plates. To further prevent relative rotational movement between the cutting blade and the securement plates, teeth 376 and 377 can be provided in the securement plates, as described above in the embodiment illustrated in FIGS. 6 and 7.

The embodiment depicted in FIG. 9 is similar to the embodiment in FIG. 8. However, cutting blade 480 has a rib 483 that extends upwardly from the top surface of the rim of the cutting blade, and also has an opposing rib 490 extending downwardly from the bottom surface of the rim of the cutting blade. Securement plate 471 has a shoulder 487 that engages the outer surface of the rib 483, and securement plate 472 similarly has a shoulder 492 that engages the outer surface of rib 490. The abutment of the ribs and shoulders prevents the cutting blade 480 from moving relative to the securing plates. The securing plates may also be provided with teeth 476 and 477, as described above in the embodiment shown in FIGS. 6 and 7, to further prevent relative movement between the cutting blade and securing plates.

In the embodiments illustrated in FIGS. 6-9, the upper securement plate and the lower securement plate can be of identical construction so that the plates are interchangeable. In these embodiments, the securing plates are attached to the lawn trimmer in the same manner described above for the construction shown in FIG. 5.

By way of example, in the preferred embodiment which is illustrated in FIGS. 1 and 2, the apertures 42 are 0.26 inch in diameter and the head 56 of the protrusions is 0.29 inch in diameter, with the neck of the protrusions being less than 0.26 inch in diameter. There are at least three apertures 42, most preferably eight, corresponding to the eight teeth 38 on the cutting blade, and the teeth are in radial alignment with the apertures. The rim is six inches in diameter and defines a central opening that preferably is between 3.5 inches and 5.0 inches in diameter.

The teeth 38 are beveled at both the leading and trailing edges, as shown in FIG. 3, to permit the blade to be turned upside down and used in the opposite direction, if desired. The preferred angle for the beveled edges relative to vertical is 60 degrees. The angle can be widened to 90 degrees which extends the life of the teeth, but the widened angle is less efficient in cutting the grass. At an angle of 45 degrees, the lawn can be cut most efficiently, but the outer ends of the teeth get rounded more quickly and require replacement. Accordingly, the angle of 60 degrees has been found most desirable.

The tooth rake, the angle $\theta$ of the cutting edge of the tooth relative to extending radially outwardly from the cutting blade, can be adjusted from zero degrees to fifteen degrees, with an angle of five degrees being preferred. As the tooth rake is increased, the teeth cut deeper into the lawn which increases the rate at which the cutter wears. At a setting of zero degrees, the lawn has a tendency to slip away from the teeth without being cut. Accordingly, the tooth rake of five degress is preferred.

The size of the cutting teeth is preferably 1.4 inches long and between 0.6 inch and 0.7 inch wide. When the teeth are more than 1.4 inches long, they tend to flutter when operating. To prevent the fluttering, the teeth can be widened but as the teeth are widened, the space between the teeth becomes narrower, and the cutting efficiency is reduced when there is insufficient space between the teeth.

The thickness of the rim and teeth is preferably between 0.12 inch and 0.16 inch, and is most preferably 0.15 inches. As the thickness of the cutter is decreased, the efficiency of the cutting blade increases, but the life of the cutting blade is shortened.

The greatest amount of wear in the teeth 38 occurs along the outer end 39a of the teeth. As shown in FIG. 4, to minimize the wear of the teeth, a rib 94 extends outwardly from at least one surface of each cutting tooth, and preferably outwardly from both surfaces of the cutting tooth. The rib has a rounded outer surface. The rib 94 extends inwardly from the outer end 39a of the cutting tooth and is parallel to, and spaced-apart from, the front cutting edge 39b and the back cutting edge 39c of the cutting tooth. The rib thickens the cutting tooth to lessen outside wear, and also strengthens the cutting tooth as well as lessening the curling or bending of the cutting tooth.

While this invention is suseptible of embodiment in many different forms, there is shown in the drawings and described herein in detail a preferred embodiment of the invention, with the understanding that the present disclosure is to be considered as an exemplification of the principles of the invention and is not intended to limit the invention to the embodiment illustrated. The scope of the invention is pointed out in the appended claims.

I claim:

1. A lawn trimmer blade comprising a generally flat plate made solely of a flexible plastic material, said blade being generally circular and including a rim defining a central opening and a plurality of cutting teeth extending outwardly from said rim, and means defined by said rim whereby the blade can be secured to said lawn trimmer at said rim and beyond said central opening, wherein said cutting teeth each have a front end, a back end, and an outer end, said cutting teeth each have a predetermined length by which they extend outwardly from said rim, said cutting teeth have a predetermined width, and said cutting teeth have a top surface, a bottom surface, and a predetermined thickness between said surfaces, and rib means protrudes outwardly from at least one of said top and bottom surfaces of each cutting tooth and extends along the length of each cutting tooth.

2. A lawn trimmer as defined in claim 1 wherein said rib means protrudes outwardly from both the top surface and the bottom surface of said cutting teeth.

3. In a lawn trimmer having a frame, an engine and a shaft for transmitting power from the engine, the improvement comprising a cutting blade and securing plate means for attaching said cutting blade to said lawn trimmer, wherein said cutting blade is formed solely of a flexible plastic material, has a predetermined thickness and is generally flat, wherein said cutting blade is generally circular and has a rim defining a central opening and a plurality of teeth extending outwardly from said rim, wherein said securing plate means is generally circular and has a central portion and an outer portion, said securing plate means has first means associated with said outer portion for securing said cutting blade to said securing plate means at said rim and beyond said central opening, and means for securing said securing plate means to said lawn trimmer, wherein said securing plate means comprises a pair of plates, one of said securing plates is positioned above said cutting blade and the other of said securing plates is positioned below said cutting blade, and wherein said outer portion of each securing plate engages an opposing surface of said rim for securing said cutting blade to said securing plates, and wherein said cutting blade has second means associated with said rim for securing said cutting blade to said lawn trimmer, said second means comprising rib means protruding outwardly from at least one surface of said rim, and the outer portion of at least one of said securing plates has an inner wall that defines a shoulder for engagement with said rib means.

4. A lawn trimmer as defined in claim 3 wherein said rib means protrudes outwardly from the two opposing surfaces of said rim.

* * * * *